US012020250B2

(12) United States Patent
Miller et al.

(10) Patent No.: US 12,020,250 B2
(45) Date of Patent: Jun. 25, 2024

(54) TRANSACTION BASED AUTHENTICATION WITH ITEM-LEVEL DATA

(71) Applicant: Capital One Services, LLC, McLean, VA (US)

(72) Inventors: Daniel Miller, Astoria, NY (US); Joshua Edwards, Philadelphia, PA (US); Jenny Melendez, Falls Church, VA (US); David Septimus, New York, NY (US); Tyler Maiman, Melville, NY (US); Viraj Chaudhary, Katy, TX (US); Samuel Rapowitz, Roswell, GA (US); Vyjayanthi Vadrevu, Pflugerville, TX (US)

(73) Assignee: Capital One Services, LLC, McLean, VA (US)

( * ) Notice: Subject to any disclaimer, the term of this patent is extended or adjusted under 35 U.S.C. 154(b) by 16 days.

(21) Appl. No.: 17/386,962

(22) Filed: Jul. 28, 2021

(65) Prior Publication Data

US 2023/0033368 A1 Feb. 2, 2023

(51) Int. Cl.
*G06Q 40/00* (2023.01)
*G06Q 20/40* (2012.01)
*H04L 9/40* (2022.01)

(52) U.S. Cl.
CPC ....... *G06Q 20/4014* (2013.01); *H04L 63/083* (2013.01)

(58) Field of Classification Search
CPC .......................... G06Q 20/4014; H04L 63/083
(Continued)

(56) References Cited

U.S. PATENT DOCUMENTS

| 7,672,870 B2 | 3/2010 | Haines et al. |
| 7,810,134 B2 | 10/2010 | Loomis et al. |

(Continued)

FOREIGN PATENT DOCUMENTS

| WO | WO-2006074150 A1 * | 7/2006 | ............. G06F 21/31 |
| WO | WO-2017083961 A1 * | 5/2017 | ............. G06Q 20/34 |
| WO | WO-2017127564 A1 * | 7/2017 | ........... G06Q 20/065 |

OTHER PUBLICATIONS

Just, "Designing and Evaluating Challenge-Question Systems," Public Works and Government Services, Canada, Usability and Security, 2004 (Year: 2004).*

(Continued)

*Primary Examiner* — Abhishek Vyas
*Assistant Examiner* — William B. Bunker
(74) *Attorney, Agent, or Firm* — Banner & Witcoff, Ltd.

(57) ABSTRACT

Aspects described herein may provide techniques for authenticating a user using transaction-based authentication questions that are generated based on item-level purchase data. The item-level purchase data of a transaction may include specific details of a transaction such as identification of each item purchased and corresponding prices paid for each item. Transaction-based authentication questions for a financial account may be generated based on the item-level purchase data that an authorized user of the financial account is likely to remember and that a malicious actor is unlikely to correctly guess. As a result, the authorized user of the account is likely to be correctly authenticated while the malicious actor is likely to answer the transaction-based authentication question incorrectly. Authentication can therefore effectively block malicious actors without overly burdening actual authorized users during the authentication process.

20 Claims, 5 Drawing Sheets

(58) Field of Classification Search
USPC .......................................................... 705/44
See application file for complete search history.

(56) References Cited

U.S. PATENT DOCUMENTS

| | | | | |
|---|---|---|---|---|
| 8,745,698 | B1* | 6/2014 | Ashfield | H04L 63/08 |
| | | | | 726/4 |
| 9,594,921 | B2* | 3/2017 | Cheng | H04L 63/0428 |
| 9,633,322 | B1* | 4/2017 | Burger | G06Q 20/4014 |
| 10,755,281 | B1* | 8/2020 | Yip | G06Q 20/4016 |
| 11,436,596 | B2* | 9/2022 | Pliasunov | G06Q 20/4016 |
| 11,593,773 | B1* | 2/2023 | Yip | G06Q 20/4015 |
| 11,907,946 | B2* | 2/2024 | John | G06F 21/35 |
| 2012/0323663 | A1 | 12/2012 | Leach | |
| 2013/0160098 | A1* | 6/2013 | Carlson | G06F 21/31 |
| | | | | 726/6 |
| 2015/0032522 | A1* | 1/2015 | Dintenfass | G06Q 30/0226 |
| | | | | 705/14.27 |
| 2015/0142593 | A1* | 5/2015 | Chauhan | G06Q 20/047 |
| | | | | 705/21 |
| 2015/0161366 | A1* | 6/2015 | Ghosh | G06Q 20/4014 |
| | | | | 726/5 |
| 2015/0220925 | A1* | 8/2015 | Brickell | G06Q 20/36 |
| | | | | 705/41 |
| 2015/0220999 | A1* | 8/2015 | Thornton | H04M 15/805 |
| | | | | 705/14.66 |
| 2016/0057143 | A1* | 2/2016 | Carlson | H04L 63/20 |
| | | | | 726/26 |
| 2016/0189153 | A1 | 6/2016 | Luk et al. | |
| 2017/0091764 | A1* | 3/2017 | Lloyd | G06Q 20/3224 |
| 2017/0250968 | A1* | 8/2017 | Licht | H04L 63/08 |
| 2019/0340613 | A1* | 11/2019 | Ghosh | H04L 9/3271 |
| 2019/0385170 | A1* | 12/2019 | Arrabothu | G06N 3/08 |
| 2020/0193443 | A1* | 6/2020 | Piel | G06N 20/00 |
| 2021/0374764 | A1* | 12/2021 | Kramme | G06Q 20/401 |

OTHER PUBLICATIONS

Mondal et al., "Transaction Authorization from Know Your Customer (KYC) Information in Online Banking," 9th International Conference on Electrical and Computer Engineering, 2016 (Year: 2016).*

* cited by examiner

TRANSACTION BASED AUTHENTICATION WITH ITEM-LEVEL DATA

FIELD OF USE

Aspects of the disclosure relate generally to authenticating a user. More specifically, aspects of the disclosure provide techniques for implementing a knowledge-based authentication (KBA) process based on item-level purchase data associated with a transaction.

BACKGROUND

Financial accounts may be maintained by a financial institution. A user may be required to be authenticated in order to grant a request from the user to access sensitive information or to perform a financial transaction associated with the financial account. Conventional systems for authenticating the user may generate transaction-based questions using data from transactions conducted using the financial account. These conventional systems may grant the request from the user if the user provides a correct answer to a transaction-based question posed to the user. These conventional systems, however, fail to generate the transaction-based questions based on specific details of a transaction including, for example, specific items purchased and/or specific costs of items (e.g., item-level purchase financial data). As a result, a malicious actor that may have gained access to a financial account statement may be able to easily answer authentication questions that do not request an individual to provide answers that require knowledge of specific details of a transaction. The malicious actor may consequently be mistakenly granted access to the financial account, thereby frustrating the purpose of the authentication process and rendering the financial account vulnerable to fraudulent activity.

Aspects described herein may address these and other problems, and generally enable a user to be verified in a more reliable and robust manner, thereby improving the integrity of the authentication process.

SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below.

Aspects described herein may provide techniques for authenticating a user using transaction-based authentication questions that are generated based on item-level purchase data. The item-level purchase data of a transaction may include specific details of a transaction such as identification of each item purchased and identification of corresponding prices paid for each item. Transaction-based authentication questions may be generated based on the item-level purchase data that an authorized user of an account is likely to remember and that a malicious actor is unlikely to guess. As a result, the authorized user of the account is likely to be correctly authenticated while the malicious actor is likely to answer the transaction-based authentication question incorrectly. Authentication can therefore effectively block malicious actors without overly burdening actual authorized users during the authentication process.

For example, some aspects described herein may provide a computer-implemented method for authenticating a user using transaction-based authentication questions that are based on specific item-level purchase data. A computing device may receive, from a user device, a request for authorization to perform an action relating to a financial account. The computing device may receive, from one or more databases, financial transaction data relating to the financial account. The computing device may determine, based on the financial transaction data relating to the financial account, a first financial transaction. The computing device may determine a merchant associated with the first financial transaction. The computing device may receive item-level purchase data associated with the first financial transaction. The item-level purchase data may comprise one or more of: an indication of an item purchased from the merchant within a predetermined period of time; and a corresponding price of the item. The computing device may generate, based on the merchant and the item-level purchase data, an authorization question for determining whether to perform the action relating to the financial account. The computing device may generate, based on the financial transaction data, the authorization question, and the item-level purchase data, a correct answer to the authorization question. The computing device may provide the authorization question to the user device; receive a response to the authorization question from the user device. The computing device may then determine, based on the response to the authorization question, to grant the request for authorization to perform the action relating to a financial account based.

In some embodiments, generating the authorization question may further comprise generating the authorization question to include a request for the user to indicate the item associated with the first transaction. Generating the authorization question may further comprise generating the authorization question to include a request for the user to indicate the corresponding price of the item associated with the first transaction. Generating the authentication may further comprise generating the authorization question to include a request for the user to indicate the merchant associated with the first transaction. Receiving the item-level purchase data associated with the first financial transaction may further comprise receiving the item-level purchase data based on the user providing a receipt associated with the first transaction. Receiving the item-level purchase data associated with the first financial transaction may further comprise receiving the item-level purchase data from the merchant associated with the first transaction. Receiving the item-level purchase data associated with the first financial transaction may further comprise receiving email data associated with the user and determining, based on the received email data associated with the user, a first email associated with the first transaction. The first e-mail may be generated by the merchant and/or by a financial account provider. Determining the first transaction may further comprise determining the first transaction based on a spending model of the financial account. Determining the first transaction may further comprise determining the first transaction based on a machine learning model, the machine learning model trained, based on historical financial transactions conducted by a plurality of different users, to identify, based on input financial transaction data, one or more transactions likely to be considered memorable. Determining the first transaction may further comprise determining the first transaction based on a machine learning model, the machine learning model trained, based on historical financial transactions conducted by a plurality of different users, to identify, based on input financial transaction data, one or more transactions likely to be considered as deviating from a typical spending pattern associated with the financial account. The action may comprise accessing funds of the financial account and/or accessing secure information relating to the financial account.

Corresponding apparatus, systems, and computer-readable media are also within the scope of the disclosure.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

In the following description of the various embodiments, reference is made to the accompanying drawings, which form a part hereof, and in which is shown by way of illustration various embodiments in which aspects of the disclosure may be practiced. It is to be understood that other embodiments may be utilized and structural and functional modifications may be made without departing from the scope of the present disclosure. Aspects of the disclosure are capable of other embodiments and of being practiced or being carried out in various ways. Also, it is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof.

By way of introduction, aspects discussed herein may relate to methods and techniques for authenticating a user based on item-level financial data associated with one or more transactions. A user that should be authenticated (e.g., an actual owner of a financial account) is likely to correctly answer a transaction-based question based on the item-level financial data while a malicious actor is unlikely to correctly answer such a question, and at best may only provide a guess when answering such a question. The item-level financial data may include, for example, an identification of one or more items purchased during a transaction at a merchant and/or an identification of the corresponding price paid for each item. Authentication questions may be generated based on the item-level financial data and presented to an individual. The individual may be determined to be an authorized user of a financial account based on a correct answer to the authentication questions while a malicious actor may be denied authentication after providing an incorrect answer.

According to the techniques described herein, a user may be authenticated using transaction-based authentication questions (e.g., knowledge-based authentication (KBA)). The transaction-based authentication questions may be generated and presented to the user. The transaction-based authentication questions may relate to transactions conducted using a financial account. In particular, the authentication questions may be generated based on specific details of one or more transactions including, for example, a specific item purchased, a specific category of item purchased, and/or a specific price paid for an item.

Aspects described herein improve the functioning of computers by improving the way in which computing devices authenticate a user. Conventional computing devices implementing conventional techniques for authenticating a user need not consider specific details of a transaction including, for example, a specific item purchased, a specific category of item purchased, and/or a specific price paid for an item. A malicious actor may be able to more easily answer authentication questions that are not based on specific details of a transaction, particularly if the malicious actor has access to an account statement of a financial account. As a result, the integrity of the authentication process may be compromised, rendering the authentication process ineffective (e.g., as an indicator of the user's knowledge of transaction information). As a further result, a malicious actor may be authorized by mistake, making the financial account vulnerable to fraudulent activity. Significant time and energy must then be expended to deal with the fallout of fraudulent activity related to the financial account. By providing improved authorization techniques—for example, based on specific item-level financial transaction data—authorization may be conducted more accurately and efficiently with lower risk that a malicious actor is mistakenly granted authorization. Over time, the processes described herein may save processing time, network bandwidth, and other computing resources. Moreover, such improvement cannot be performed by a human being with the level of accuracy obtainable by computer-implemented techniques to ensure accurate authentication of a user and improved detection of a malicious actor.

Before discussing these concepts in greater detail, however, several examples of a computing device that may be used in implementing and/or otherwise providing various aspects of the disclosure will first be discussed with respect to FIG. 1.

Figure 1:
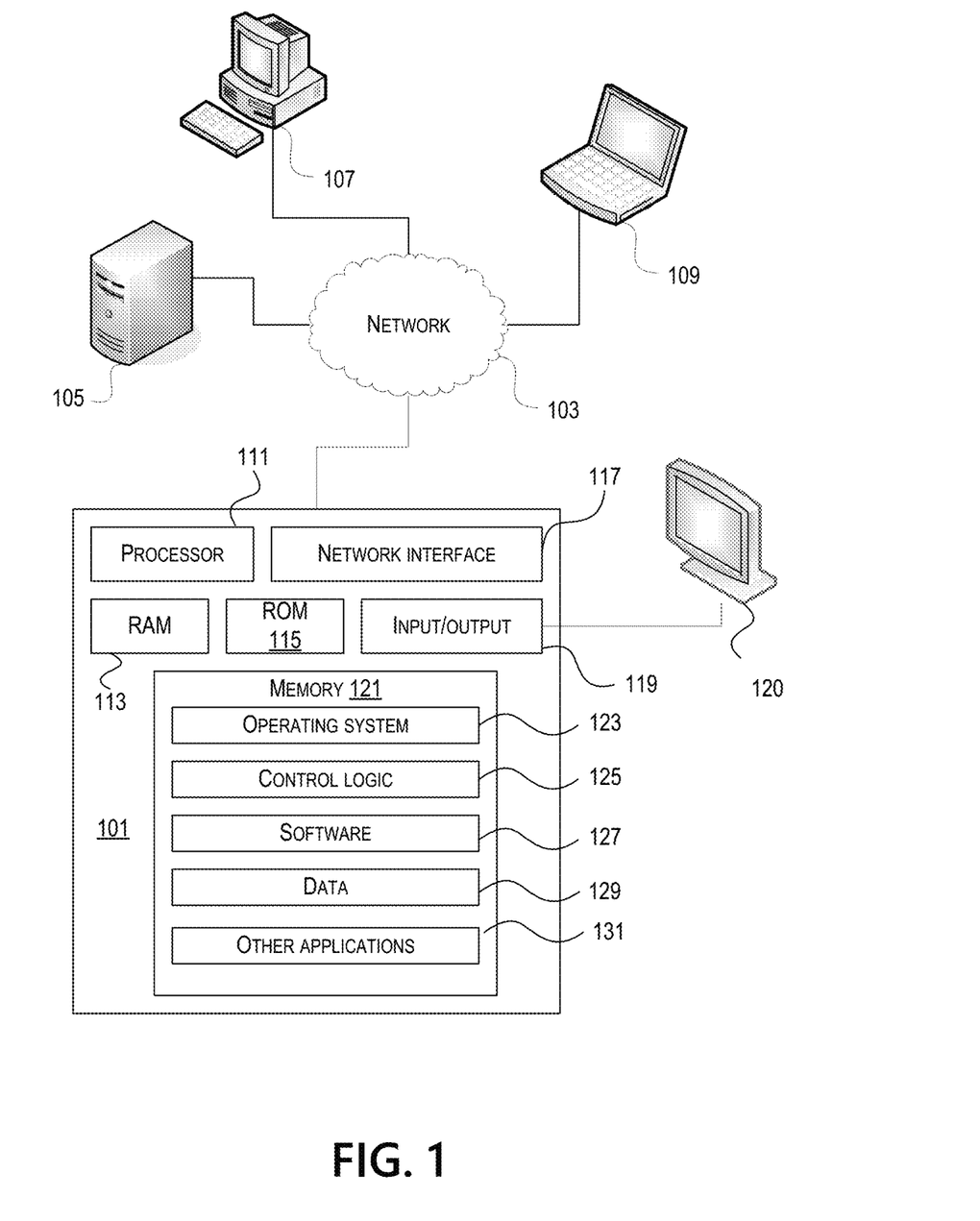
FIG. 1 depicts an example of a computing device that may be used in implementing one or more aspects of the disclosure in accordance with one or more illustrative aspects discussed herein.

FIG. 1 illustrates one example of a computing device 101 that may be used to implement one or more illustrative aspects discussed herein. For example, computing device 101 may implement one or more aspects of the disclosure by reading and/or executing instructions and performing one or more actions based on the instructions. The computing device 101 may represent, be incorporated in, and/or include various devices such as a desktop computer, a computer server, a mobile device (e.g., a laptop computer, a tablet computer, a smart phone, any other types of mobile computing devices, and the like), and/or any other type of data processing device.

Computing device 101 may operate in a standalone environment. In others, computing device 101 may operate in a networked environment. As shown in FIG. 1, various network nodes 101, 105, 107, and 109 may be interconnected via a network 103, such as the Internet. Other networks may also or alternatively be used, including private intranets, corporate networks, local area networks (LANs), wireless networks, personal networks (PAN), and the like. Network 103 is for illustration purposes and may be replaced with fewer or additional computer networks. A LAN may have one or more of any known LAN topologies and may use one or more of a variety of different protocols, such as Ethernet. Devices 101, 105, 107, 109 and other devices (not shown) may be connected to one or more of the networks via twisted pair wires, coaxial cable, fiber optics, radio waves, or other communication media.

As seen in FIG. 1, computing device 101 may include a processor 111, RAM 113, ROM 115, network interface 117, input/output interfaces 119 (e.g., keyboard, mouse, display, printer, etc.), and memory 121. Processor 111 may include one or more computer processing units (CPUs), graphical processing units (GPUs), and/or other processing units such as a processor adapted to perform computations associated with machine learning. I/O 119 may include a variety of interface units and drives for reading, writing, displaying, and/or printing data or files. I/O 119 may be coupled with a display such as display 120. Memory 121 may store software for configuring computing device 101 into a special purpose computing device in order to perform one or more of the various functions discussed herein. Memory 121 may store operating system software 123 for controlling overall operation of computing device 101, control logic 125 for instructing computing device 101 to perform aspects discussed herein, software 127, data 129, and other applications 131. Control logic 125 may be incorporated in and may be a part of software 127. In other embodiments, computing device 101 may include two or more of any and/or all of these components (e.g., two or more processors, two or more memories, etc.) and/or other components and/or subsystems not illustrated here.

Devices 105, 107, 109 may have similar or different architecture as described with respect to computing device 101. Those of skill in the art will appreciate that the functionality of computing device 101 (or device 105, 107, 109) as described herein may be spread across multiple data processing devices, for example, to distribute processing load across multiple computers, to segregate transactions based on geographic location, user access level, quality of service (QoS), etc. For example, devices 101, 105, 107, 109, and others may operate in concert to provide parallel computing features in support of the operation of control logic 125 and/or software 127.

One or more aspects discussed herein may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HTML or XML. The computer executable instructions may be stored on a computer readable medium such as a hard disk, optical disk, removable storage media, solid state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects discussed herein, and such data structures are contemplated within the scope of computer executable instructions and computer-usable data described herein. Various aspects discussed herein may be embodied as a method, a computing device, a data processing system, or a computer program product.

Figure 2:
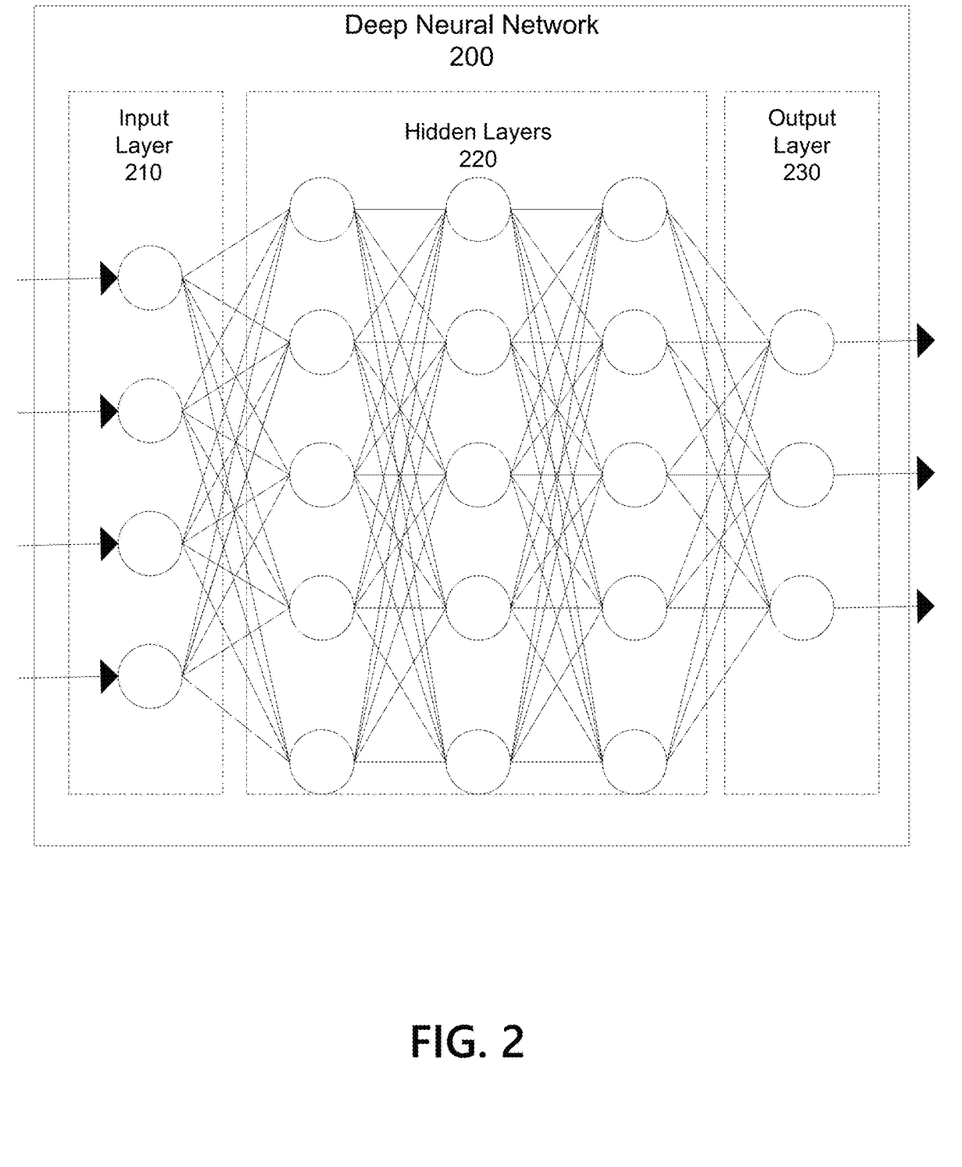
FIG. 2 depicts an example deep neural network architecture for a model according to one or more aspects of the disclosure.

FIG. 2 illustrates an example deep neural network architecture 200. Such a deep neural network architecture may be all or portions of the machine learning software 127 shown in FIG. 1. That said, the architecture depicted in FIG. 2 need not be performed on a single computing device, and may be performed by, e.g., a plurality of computers (e.g., one or more of the devices 101, 105, 107, 109). An artificial neural network may be a collection of connected nodes, with the nodes and connections each having assigned weights used to generate predictions. Each node in the artificial neural network may receive input and generate an output signal. The output of a node in the artificial neural network may be a function of its inputs and the weights associated with the edges. Ultimately, the trained model may be provided with input beyond the training set and used to generate predictions regarding the likely results. Artificial neural networks may have many applications, including object classification, image recognition, speech recognition, natural language processing, text recognition, regression analysis, behavior modeling, and others.

An artificial neural network may have an input layer 210, one or more hidden layers 220, and an output layer 230. A deep neural network, as used herein, may be an artificial network that has more than one hidden layer. Illustrated network architecture 200 is depicted with three hidden layers, and thus may be considered a deep neural network. The number of hidden layers employed in deep neural network 200 may vary based on the particular application and/or problem domain. For example, a network model used for image recognition may have a different number of hidden layers than a network used for speech recognition. Similarly, the number of input and/or output nodes may vary based on the application. Many types of deep neural networks are used in practice, such as convolutional neural networks, recurrent neural networks, feed forward neural networks, combinations thereof, and others.

During the model training process, the weights of each connection and/or node may be adjusted in a learning process as the model adapts to generate more accurate predictions on a training set. The weights assigned to each connection and/or node may be referred to as the model parameters. The model may be initialized with a random or white noise set of initial model parameters. The model parameters may then be iteratively adjusted using, for example, stochastic gradient descent algorithms that seek to minimize errors in the model.

Having discussed several examples of computing devices which may be used to implement some aspects as discussed further below, discussion will now turn to various examples for conducting transaction-based authentication using item-level transaction data.

Figure 3:
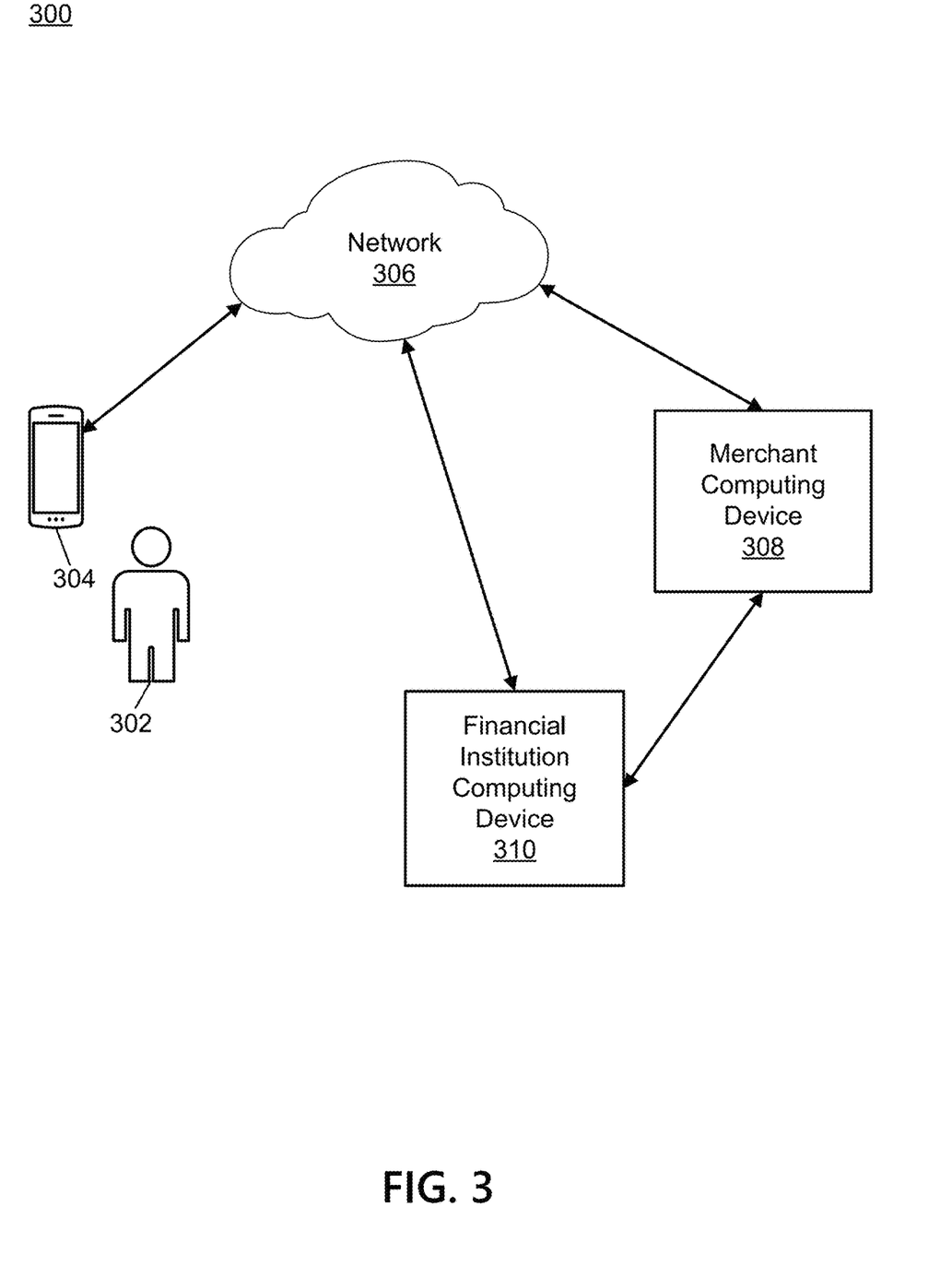
FIG. 3 illustrates an operating environment for authenticating a user.

FIG. 3 illustrates an operating environment 300 for performing transaction-based authentication using item-level financial transaction data. A user and/or a computing device may be authenticated. As shown in FIG. 3, the operating environment 300 may include a user 302, a user computing device 304, a network 306, a merchant computing device 308, and a financial institution computing device 310.

The user 302 may be any individual such as a customer. The user computing device 304 may be any type of computing device including any computing device depicted and described in relation to FIG. 1. The user computing device 304 may be, for example, a smartphone, a laptop, or a tablet.

The user computing device 304 may be a wireless device such as, for example, a portable wireless computing device.

The user computing device 304 may be associated with the user 302. The user 302 may use the user computing device 304 to conduct financial transactions. For example, the user 302 may use the user computing device 304 to purchase one or more items, products, or services from a merchant. The user 302 may use the user computing device 304 to interact with an online, web-based, and/or app-based transaction system provided by the merchant computing device 308. As an example, a merchant may provide an online, web-based, and/or app-based shopping interface (e.g., a virtual shopping interface) using the merchant computing device 308. The user 302 may use the user computing device 304 to select one or more items for purchase from the merchant.

As an alternative, the user 302 may purchase one or more items, products, or services from the merchant at a physical store. A point of sale system (POS) (e.g., a physical POS system located at the merchant's physical store) may be used to facilitate a purchase by the user 302 at a store of the merchant. Under any scenario, the user 302 may interact with one or more shopping interfaces or POS systems, whether online, virtual, or physical in-store systems, to purchase one or more items from a merchant.

The network 306 may communicatively couple the user computing device 304 with the merchant computing device 308 and the financial institution computing device 310. The network 306 may be any type of communications and/or computer network. The network 306 may include any type of communication mediums and/or may be based on any type of communication standards or protocols. The network 306 may be the same or similar to the network 103 of FIG. 1. The network 306 enables data or other information to be shared among the user computing device 304, the merchant computing device 308, and the financial institution computing device 310.

The user 302 may have one or more financial accounts maintained by a financial intuition associated with the financial institution computing device 310. For example, the user 302 may have a checking account and/or a savings account with a financial intuition associated with the financial institution computing device 310. As another example, the user 302 may have a credit card account maintained by a financial intuition associated with the financial institution computing device 310. The user 302 may use the credit card to purchase one or more items from a merchant using an online shopping interface provided by the merchant computing device 308.

The merchant computing device 308 may be any type of computing device including any computing device depicted and described in relation to FIG. 1. The merchant computing device 308 may be associated with a merchant. The merchant computing device 308 may represent one or more computing devices and/or a computer network associated with the merchant. The merchant computing device 308 may include one or more computers, servers, and/or databases. The merchant associated with the merchant computing device 308 may be any type of merchant that may sell any type of item (e.g., any good or service).

The financial institution computing device 310 may be any type of computing device including any computing device depicted and described in relation to FIG. 1. The financial institution computing device 310 may be associated with a financial institution. For example, the financial institution computing device 310 might be a server associated with a particular financial institution. The financial institution computing device 310 may represent one or more computing devices and/or a computer network associated with the financial institution. The financial institution computing device 310 may include one or more computers, servers, and/or databases.

As stated above, the user 302 associated with the user computing device 304 may have one or more financial accounts with the financial institution associated with the financial institution computing device 310. The user 302 may have a checking account, a savings account, a line of credit, and/or a credit card account provided through the financial institution associated with the financial institution computing device 310. In general, the user 302 associated with the user computing device 304 may have any type of financial account with the financial institution associated with the financial institution computing device 310. The financial institution may be a bank, credit union, credit card company, or any other type of financial institution that may provide one or more financial accounts to an individual.

The financial institution computing device 310 may store information related to various financial accounts maintained by the financial institution associated with the financial institution computing device 310. For example, the financial institution computing device 310 may store data or other information related to various transactions for each financial account maintained by the financial institution. The financial institution computing device 310 may store information related to various financial accounts associated with the user 302 (e.g., data or other information related to various transactions for each financial account associated with the user 302). The transaction data may include any type of transaction data related to a transaction such as, for example, a date, a time, an amount charged, an amount credited (e.g., an amount refunded), and a merchant name for a transaction. The transaction data may also include stock-keeping unit (SKU) data that may include or may be used to determine an item or service related to a particular transaction (e.g., an item or product purchased during a particular transaction). In general, the transaction data may include an indicator for each item purchased by the user 302, a cost of each item, a date and a time when the item was purchased, and a location or merchant where the item was purchased. Transaction data, such as SKU data, data indicating an item, good, or service purchased, and/or data indicating a cost or a price of an item may be considered to be item-level financial transaction data. This item-level financial transaction data may be associated or correlated with a particular merchant and a particular purchaser (e.g., the account owner or a particular authorized user of a financial account).

As described herein, the user 302 may use the user computing device 304 to attempt to conduct a financial transaction using (e.g., funded by) the financial account maintained by the financial institution computing device 310 and/or the user 302 may use the user computing device 304 to attempt to access sensitive or secure information related to the financial account maintained by the financial institution computing device 310. Any such attempt by the user 302 may trigger the financial institution computing device 310 to verify or authenticate the user 302 (e.g., to ensure the user 302 is allowed to access the requested information or to have a requested transaction conducted). For example, any such attempt by the user 302 may cause the financial institution computing device 310 to operate to authenticate the identity of the user 302 to ensure the user 302 is indeed the individual associated with the financial account and therefore authorized to perform the requested transaction or to access the requested information.

The financial institution computing device 310 may authenticate the user 302 by generating transaction-based questions (e.g., authentication or authorization questions). The authentication questions may be based on transaction data associated with the financial account with which the user 302 requests an action to be performed (e.g., a request to perform a transaction and/or a request to access secure information). The authentication question may be considered to be knowledge-based questions as they require the user 302 to be familiar with underlying data (e.g., transaction data related to a financial account) to answer the questions correctly. Accordingly, the authentication process may be considered to be a knowledge-based authentication (KBA) process.

As an example, the user 302 may request an action be performed relating to the financial account associated with the user 302. In response, the financial institution computing device 310 may receive a request for authorization to perform the action relating to the financial account associated with the user 302. The financial institution computing device 310 may generate one or more authentication questions based on the transaction data associated with the financial account associated with the user 302.

The one or more authentication questions may be directed to any aspect of any transaction conducted using the financial account associated with the user 302. The financial institution computing device 310 may generate the one or more authentication questions based on transaction data stored by the financial institution computing device 310. As an example, an authentication question may relate to a merchant with which the user 302 has conducted a transaction using the financial account associated with the user 302. The authentication question may ask the user 302 to indicate whether or not the user 302 conducted a transaction with a particular merchant within a particular period of time (e.g., a predetermined period of time prior to the user 302 requesting an action be performed relating to the financial account associated with the user 302).

The authentication question may also include or indicate an amount of a transaction or an item or service that may have been purchased. The authentication question may be posed as any type of question including, for example, a true/false (T/F) question, a multiple-choice question, or a yes/no (Y/N) question. The authentication question may be posed in a manner that requests the user 302 to provide an answer either verbally and/or by entering an answer electronically using the user computing device 304 (e.g., via a keypad or touchscreen). The financial institution computing device 310 may also generate a correct or expected answer to the authentication question.

The authentication question may provide one or more correct answers to the user 302 and/or one or more incorrect or false answers to the user 302. The financial institution computing device 310 may authorize the user 302 (e.g., and/or authorize the request to perform the action relating to the first financial account associated with the user 302) based on the response of the user 302.

As an example, the user 302 may be logged into the financial account through a web-based interface. The user 302 may then request a relatively large sum or amount of funds to be transferred to another financial account maintained by another financial institution. The large transfer request may trigger the financial institution computing device 310 to initiate an authentication process of the user 302. The user 302 may have undergone an initial authentication process to gain online access to the account; however, the large transfer request may trigger a more robust and KBA authentication process. The financial institution computing device 308 may then operate to further authenticate the user 302.

According to technique described herein, the KBA authentication process performed by the financial institution computing device 310 may involve item-level financial transaction data. The item-level financial transaction data may include data indicating specific items purchased by the user 302, the costs of specific items purchased by the user 302, and/or the merchant where the user 302 purchased a particular item. Authentication questions may then be generated and presented to the user that request the user 302 to identify a specific item purchased or identify a merchant where a particular item was purchased. Any type of authentication question involving or based on such item-level financial transaction data may be generated and provided to the user 302.

Many conventional authentication processes and systems may generate and rely on transaction-based questions that do not involve or that are not based on item-level financial transaction data. Such conventional processes and systems need not generate transaction-based questions that involve or are based on data that only the purchaser may be aware. Instead, these conventional processes and systems may only generate transaction-based questions that may be fairly high level—and may be limited to only asking about what merchants the user 302 conducted a transaction. Such transaction-based questions may be more easily answered by a malicious actor than transaction-based questions that are based on item-level financial transaction data as described herein.

For example, the conventional authentication processes and systems may generate and rely on transaction-based questions that involve transactions that are shown (e.g., details of the transaction) on an issued account statement (e.g., a paper statement or an online account summary statement). This renders the conventional authentication processes and systems susceptible to circumvention by a malicious actor that gains access to the issued account statement of the financial account. In particular, a malicious actor that obtains a financial account statement for a financial account (e.g., by stealing their mail) may be able to answer transaction-based authentication questions by simply reviewing the data provided on the financial account statement.

To provide a more robust authentication process, techniques described herein may generate and rely on transaction-based questions that involve data that is not readily available on an issued financial account statement, or that might not be easily answered by a malicious actor because the questions are based on low-level data that only the purchaser/user 302 may be aware. A malicious actor that gains access to the issued account statement of a financial account will not gain access to details of exactly what items were purchased, or the specific costs of such items (e.g., if one or more items were purchased together and the issued financial account statement only shows a total purchase price for the transaction). As such, the malicious actor is unlikely to be able to correctly answer a transaction-based authorization question based on item-level financial transaction data.

This is because authentication questions based on item-level data—such as the item purchase and/or its price—have a low "guessability" (i.e., a malicious actor has a low likelihood of answering such questions correctly by guessing). On the other hand, the actual owner of the financial account (or authorized user of the financial account) may be able to easily answer the transaction-based authorization question based on the item-level financial transaction data, and be authenticated to allow performance of a request related to the financial account. In this manner, the techniques described herein provide enhanced security when re-authenticating the user 302.

Item-level financial transaction data that may be used to generate transaction-based authentication questions may be stored by the financial institution computing device 310. The financial institution computing device 310 may receive the item-level financial transaction data from any number of sources.

As a first example, the user 302 may provide a sales receipt to the financial institution computing device 310. The user 302 may provide the sales receipt the financial institution computing device 310 in any manner including, for example, uploading a copy of the sales receipt via a web-based interface provided by the financial institution computing device 310, using a smartphone to photograph and upload a photograph of a physical sales receipt, or the like. The sales receipt may provide an itemized list of items purchased by the user 302 including, for example, a cost of each item purchased, a merchant from which the items were purchased, a time of purchase, a date of purchase, and a location of the purchase. The user 302 may provide a photo of the sales receipt or may otherwise convert the sales receipt to an image that may be shared with the financial institution computing device 310. Such a photo might be processed to identify text using, for example, one or more optical character recognition (OCR) algorithms.

As a second example, the financial institution associated with the financial institution computing device 310 may receive item-level financial transaction data from the merchant associated with the merchant computing device 308. For example, the financial institution associated with the financial institution computing device 310 may have a predetermined arrangement and/or partnership with the merchant associated with the merchant computing device 308 to share item-level purchase data. Data related to a transaction conducted by the user 302 may be stored by the merchant computing device 308. This data may then be provided to the financial institution computing device 310. Sharing of this data may be approved by the user 302 for any and all transactions involving the merchant, for only select transactions, or on a transaction by transaction basis (e.g., such that the user 302 must affirmatively approve the sharing of transaction data for a particular transaction with the financial institution). The transaction data shared by the merchant with the financial institution computing device 310 may include, for example, a cost of each item purchased, a merchant from which the items were purchased, a time of purchase, a date of purchase, and a location of the purchase.

As a third example, the financial institution computing device 310 may access financial transaction data stored or provided in one or more emails of the user 302. For example, the user 302 may receive an email or other electronic notification (e.g., text message) that provides an itemized list of items purchased by the user 302 along with other information related to a transaction such as, for example, the cost of each item purchased, the merchant from which the items were purchased, a time of purchase, a date of purchase, and a location of the purchase. The financial institution computing device 310 may be provided with email data from an email server that stores or processes emails of the user 302 (e.g., the email or email service may be provided by a third-party). Additionally and/or alternatively, the user 302 might provide the financial institution computing device 310 access to their e-mails via an application programming interface (API), such as a plug-in for an e-mail application.

The financial institution computing device 310 may process the email data of the user to extract relevant item-level financial transaction data and/or the email server may re-extract the relevant item-level financial transaction data and proved it to the financial institution computing device 310. Sharing of such email data may be subject to the approval of the user 302 such that the user 302 approves any and all email data sharing or may be required to indicate on an email by email basis what emails to share with the financial institution computing device 310.

Under any scenario, the financial institution computing device 310 may parse data provided to it by any merchant or any other third-party (e.g., an email service provider, a cellular provider, etc.) to extract relevant item-level financial transaction data for any type of transaction conducted by the user 302.

According to the techniques described herein, authentication questions generated based on item-level financial transaction data may account for the type of financial card used to conduct a transaction. For example, the user 302 may have a financial card that is associated with a particular merchant (e.g., a merchant branded card). Such financial card may only be used at the associated merchant. Accordingly, authentication questions based on transactions using a branded card may be generated to be more robust than just inquiring where the user 302 conducted a transaction, as such question would have a high "guessability" given the financial card is limited to use at a particular merchant. Authentication questions based on transactions using a branded card may therefore be more robust and may instead inquire about particular products purchased, or particular prices paid for certain items. Alternatively, techniques described herein may remove transactions that use branded cards when selecting a subset of financial transaction data of the user 302 to use for generating authentication questions.

The financial institution computing device 310 may generate transaction-based authentication questions based on the financial transaction information, including item-level financial transaction data, that may be provided by the merchant commuting device 308. A transaction-based authentication question may be generated requesting the user 302 to identity one or more items purchased by the user 302. For example, a transaction-based authentication question may ask: "Which of the following items did you purchase recently?" and may provide a listing of different items. One or more of the listed items may be items the user 302 purchased while one or more listed items may be items the user 302 did not purchase recently (e.g., within a predetermined time period).

A transaction-based authentication question may be generated requesting the user 302 to confirm whether or not a specific item was purchased by the user 302. For example, a transaction-based authentication question may ask: "Did you buy a TV recently?" and may identify the TV by brand name. The user 302 may then be expected to answer either yes or no to such a question.

A transaction-based authentication question may be generated that combines features regarding a particular item purchased with a merchant where the item was purchased. For example, a transaction-based authentication question may ask: "Did you recently buy a TV at Bob's Big Box Store?" and may identity the TV by brand name and may specifically identify the merchant where the user recently purchased a TV. The user 302 may then be expected to answer either yes or no to such a question. Additionally and/or alternatively, the user might be expected to identify which brand of television that they recently purchased, an approximate amount that the television cost, or the like.

A transaction-based authentication question may be generated that requests the user 302 identify a price paid for a specific item or a specific category of item. For example, a transaction-based authentication question may ask: "How much did you recently pay for bread?" and may provide a listing of different prices. The user 302 may then be expected to answer correctly identify the price paid for the specific item. The transaction-based authentication question may or might not identify the merchant or may alternatively identify the merchant and identify a category of the purchased item. For example, a transaction-based authentication question may ask: "How much did you recently pay for a grocery item at Bob's Big Box Store?" and may provide a listing of different prices. The user 302 may then be expected to answer correctly identify the price paid for the specific item.

Under any scenario, the transaction-based authentication question may include any details including (e.g., including any combination of the following): a specific item purchased; a category of item purchased (e.g., automobile-related products, groceries, sporting equipment, etc.) rather than the specific item purchased; a price paid for the specific item or a price range for the specific item; a merchant where the specific item was purchased; a location (e.g., address, city, part of town, etc.) where the specific item was purchased; and/or a date and/or a time where the specific item was purchased.

The financial institution computing device 310 may generate, in whole or in part, transaction-based authentication questions based on item-level financial transaction data using machine learning techniques. A machine learning model (e.g., executing via the machine learning software 127 and/or the deep neural network 200) may be trained to identify memorable transactions based on training data that indicates, for different merchants and different items purchased (e.g., historical financial transactions conducted by a plurality of different users), a likelihood that a user would remember purchasing a particular item, remember conducting a transaction with a particular merchant, and/or remember a price of a particular item, or any combination thereof. For example, as part of the training process, the machine learning model might be provided training data comprising indications of various items (e.g., goods purchased by users in the past), with each item tagged with a likelihood that a purchaser of that item would remember aspects of that item when asked about it as part of an authentication question. Additionally and/or alternatively, such training data might comprise a history of authentication questions relating to item-level financial transaction data, with the training data indicating whether a user correctly answered the question(s), whether the user was authorized to access the account, and other indicia of whether the user might have had difficulty in answering the question. In this manner, the trained machine learning model might be configured to identify whether a particular transaction (e.g., in terms of an item purchased or price paid for a particular item) is likely to be memorable for a user. The trained machine learning model may be provided input data that includes financial transaction data for a variety of transactions including item-level data, and the trained machine learning model might provide output data indicating, for each of the one or more transactions, a likelihood that a user would remember the transaction. Such a likelihood might be represented as subjective and/or objective data, such as a Boolean value (e.g., such that a "TRUE" value corresponds to an item that a user may remember), a percentage value (e.g., such that an item is 75% likely to be memorable), or the like. Based on these likelihood values, certain transactions might be identified as transactions a user is likely to remember and so may be considered as a candidate for generating a transaction-based authentication question.

The machine learning model may be trained to identity memorable transactions based, at least in part, on a price paid for an item. For example, a user may purchase an item for a lower price than other consumers (e.g., the user may have bought the item on sale or with a significant discount), such that the user might favorably remember the purchase of the item. As such, the purchase of an item at a price that deviates significantly from the price typically paid for such an item may lead the transaction to be identified as a likely memorable transaction of the user. Accordingly, a transaction-based authentication question may be then generated that requests the user to identify a price (e.g., a retail price, excluding tax) paid for a certain product, a location (e.g., merchant) where a certain amount of money was spent, or to identify an item purchased for less than or more than a certain price. To train the machine learning model in this manner, the machine learning model might be provided training data that correlates the price of various items (e.g., ranges of prices for particular categories of items) with memorability (e.g., a likelihood that one or more users would remember the transaction). In this manner, for example, the machine learning model might learn that users are only somewhat likely to remember a purchase price of a television if it was purchased for the Manufacturer's Suggested Retail Price (MSRP), but might be somewhat more likely to remember the purchase price of the same television if it is substantially lower than MSRP. In this manner, when the trained machine learning model is provided input data indicating an item and a price paid for that item, the trained machine learning model might be configured to output some indication of a likelihood that a user remembers the price paid for that item.

The machine learning model may be trained to identity memorable transactions based, at least in part, on typical spending habits or a model of a user's spending habits. Different users might have different spending habits. For example, a user might not typically purchase certain items from a certain merchants (e.g., the user might not purchase groceries from a big box retailer that also sells tires). As such, the purchase of a particular category of item (e.g., groceries) from a particular type of store may lead the transaction to be identified as a likely memorable transaction of the user. This may allow the financial institution computing device 310 to generate transaction-based authentication questions that are directed to likely memorable transactions based on spending patterns of a user. A machine learning model might be trained using a history of user spending habits to identify commonalities in spending habits. To perform such training, the machine learning model might be provided untagged data comprising the spending habits of various users, their demographic data, and other relevant information. The training data might be tagged with indications of which item(s) and/or purchase(s) are particularly memorable to those user(s). In this manner, the machine learning model might be trained to identify, for particular categories of users (e.g., users in particular demographic categories), which item(s) and/or transaction(s) might be memorable to those users. In turn, when the trained machine learning model is provided input data comprising an indication of a user (e.g., their demographic data) and their recent transactions, the trained machine learning model might output an indication of one or more items and/or transactions that are predicted to be memorable to that user (and/or similar users).

In doing so, transaction-based questions may be generated based on, for example, identifying whether a price paid for an item was higher or lower than usual, whether or not a certain item is typically purchased by the user, whether or not a particular item is typically purchased by the user at a particular merchant. While item-level data may be included in such transaction-based questions, categories of products or items may alternatively be used. Without identifying specific items purchased, a transaction-based question may ask if a particular category of item was purchased at a particular store recently. As an example, a transaction-based question may ask: "Did you buy groceries from Bob's Big Box Store?" and may specifically identify the merchant. As another example, a transaction-based question may ask: "Did you buy an action video game last week?" and need not specifically identify the video game title or the merchant where the game was purchased.

The machine learning models described herein may be further trained on data that includes financial transaction data, including item-level data, of memorable transactions, based on, for example, category spend, location of purchase, price paid, or particular item purchased.

Discussion will now turn to an example method for performing transaction-based authentication using item-level financial transaction data.

Figure 4:
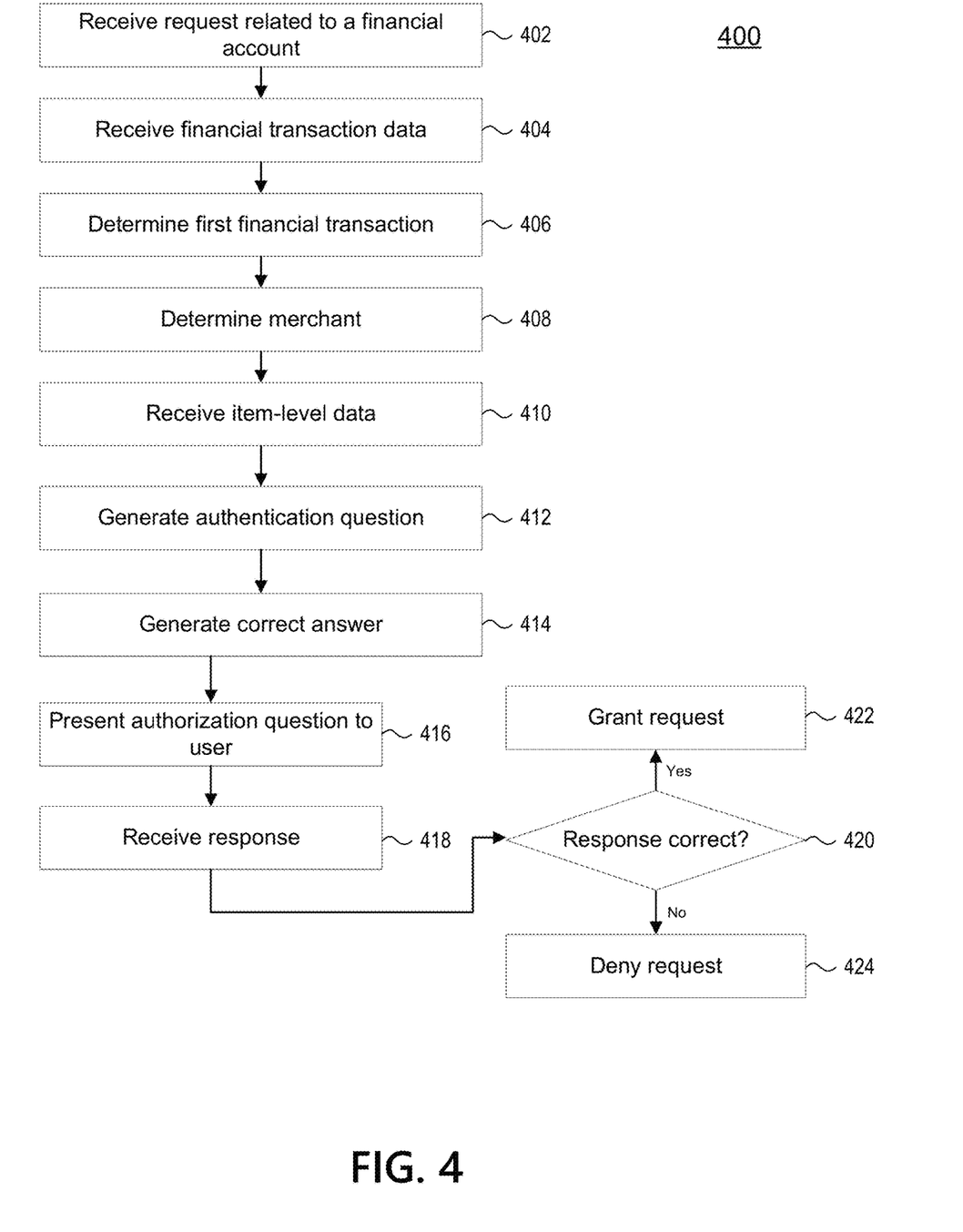
FIG. 4 illustrates an example method for authenticating a user.

FIG. 4 illustrates an example method 400 for authenticating a user or device using one or more transaction-based authentication questions based on item-level financial transaction data. A user and/or a device may undergo authentication before a requested action related to a financial account is performed. Item-level financial transaction data related to a financial account of the user may be provided. The item-level financial transaction data may be used to generate one or more transaction-based authentication questions that may be provided to the user. The user and/or device may be authenticated based on the one or more responses to the one or more transaction-based authentication questions. The item-level financial transaction data may include any data including identification of an item purchased, a price or cost of the item, or a location of where the item was purchased (e.g., including an identifier of a merchant that sold the item).

Method 400 may be implemented by a suitable computing system and/or any combination of computing systems or devices, as described herein. For example, method 400 may be implemented in any suitable computing environment by a computing device and/or combination of computing devices, such as computing devices 101, 105, 107, and 109 of FIG. 1 and/or by any one or more of the components depicted in FIG. 3 such as, for example, the user device 304, the merchant computing device 308, the financial institution computing device 310, or any combination thereof. Method 400 may be implemented in suitable program instructions, such as in software 127, and may operate on data, such as data 129. The method 400 may be implemented by computer-readable media that stores instructions that, when executed, cause performance of all or portions of the method 400. The steps shown in the method 400 are illustrative, and may be re-arranged or otherwise modified as desired.

At step 402, a request for authorization to perform an action relating to a financial account associated with a user (e.g., an owner, authorized user, or account holder) may be received. The action may comprise conducting a financial transaction using the financial account. The action may comprise accessing secure information relating to the financial account. The action may comprise accessing funds of the financial account. The financial account may be any type of account such as, for example, a personal financial account.

At step 404, financial transaction data relating to the financial account for a predetermined period of time may be received. The financial transaction data may be received from one or more databases. The financial transaction data may include any type of financial data related to a transaction including any item-level financial transaction data.

At step 406, a first financial transaction may be determined based on the financial transaction data relating to the financial account. The first financial transaction may be any transaction conducted using the financial account within a predetermined period of time. As an example, the first financial transaction may be associated with the purchase of an item at a merchant using a credit card of the user. The first financial transaction may have been conducted online or may have bene conducted in-person at a physical store.

The first financial transaction may be selected in any manner based on any criteria. As an example, the first transaction may be determined or selected based on a spending model of the financial account and/or a user of the financial account (e.g., an owner or authorized user of the financial account). The spending model may identify typical transactions and less typical transactions. Less typical transactions may be identified as particular memorable and may be identified as a candidate transaction for generating a transaction-based authentication question.

As another example, the first transaction may be determined based on a machine learning model. The machine learning model may be trained based on historical financial transactions conducted by a plurality of different users. The machine learning model may be trained to identify, based on input financial transaction data, one or more transactions likely to be considered memorable to a particular user. Alternatively, the machine learning model may be trained to identify, based on input financial transaction data, one or more transactions likely to be considered as deviating from a typical spending pattern associated with the financial account and/or user of the account.

At step 408, a merchant associated with the first financial transaction may be determined. The merchant may be any type of merchant. As an example, the merchant may be determined to be Billy's Big Box Store.

At step 410, item-level purchase data associated with the first financial transaction may be received. The item-level purchase data may include an indication of an item purchased from the merchant within a predetermined period of time and a corresponding price of the item. As an example, at steps 408-410, it may be determined that the first financial transaction may be associated with Billy's Big Box Store and may involve a charged amount of 6.50 (e.g., excluding any taxes) for bread. A first category of item purchased may also be determined based on the item purchased. For example, the first category of item purchased may be indicted to be groceries given that bread was purchased.

The item-level purchase data associated with the first financial transaction may be received from any number of sources and based on any number of processes. As a first example, the item-level purchase data may be received based on the user providing a receipt associated with the first transaction. Data from the receipt (e.g., based on an image of the receipt) may be provided by the user using a computing device of the user. As a second example, the item-level purchase data may be received from the merchant associated with the first transaction. As a third example, the item-level purchase data may be received based on receiving email data of the user. Based on the received email data associated with the user, a first email associated with the first transaction may be determined. The first email may be generated by the merchant or by the financial instruction associated with the user (e.g., a financial account provider). The first email may include item-level purchase data of the first transaction.

At step 412, an authorization question for determining whether to perform the action relating to the financial account may be generated based on the merchant and the item-level purchase data. In various embodiments, the authorization question may include a request to indicate whether a user conducted a transaction with the first merchant, whether the user purchased a particular item for a particular price, or if the user purchased a particular category of item at a particular merchant. Any type of question involving the item purchased, the price paid, and the merchant involved may be generated.

As a first example, the authorization question may include a request for the user to indicate the item associated with the first transaction. As a second example, the authorization question may include a request for the user to indicate the corresponding price of the item associated with the first transaction. As a third example, the authorization question may include a request for the user to indicate the merchant associated with the first transaction. Any of the requests indicated in these examples may be combined in any manner to generate an authentication question.

At 414, a correct answer to the authorization question may be generated based on the based on the financial transaction data, the authorization question, and the item-level purchase data.

At step 416, the authorization question may be presented to the user. The authorization may be presented to the user in any manner. For example, the authorization question may be provided verbally by a customer service representative (e.g., over a telephone connection). The authorization may be caused to be displayed to the user (e.g., on a display of a computing device of the user). The authorization question may be any type of transaction-based question. The authorization question may include a set of answer choices with one or more correct answers and/or one or more incorrect answers. The authorization question may prompt the user to answer the authorization question.

At 418, a response to the authorization question may be received. The response may be received as a verbal response and/or as a response provided though a computing device (e.g., by provided a touch-based input, keyed data entry, or other electronic data entry mechanism).

At 420, the response may be compared to the correct answer. If the response matches the correct answer, then at step 422, the request for authorization may be granted. If the response does not match the correct answer, then at step 424, the request for authorization might not be granted (e.g., may be denied). In this manner, a determination whether to grant the request for authorization to perform the action relating to the financial account may be based on the response to the authorization question.

Any of the techniques described herein for generating authentication questions may be implemented within a call center environment. For example, the user 302 may use a landline telephone or cellphone to call a call center (or may receive a call from a call center) to effectuate authentication. A call center representative may read an authentication question (including any answer choices) to the user 302 (or an authentication question may be displayed on a device used by the user). The user 302 may answer the authentication questions verbally so that the call center representative may hear the verbal response. The user 302 may then be authenticated or not authenticated based on the verbal response of the user 302.

The techniques described herein for performing authentication based on transaction-based questions that utilize item-level purchase data reduce a likelihood that a malicious actor can correctly answer the transaction-based question. Even a malicious actor that has gained access to a financial account statement (e.g., a printed financial account statement) may be unable to correctly answer transaction-based questions that require knowledge of specific items purchased. However, an authorized user of an account may be able to correctly answer such questions with ease, particularly a memorable transaction. As such, the techniques described herein provide improved security while not making the authentication process overly cumbersome or difficult to the actual authorized user.

Figure 5:
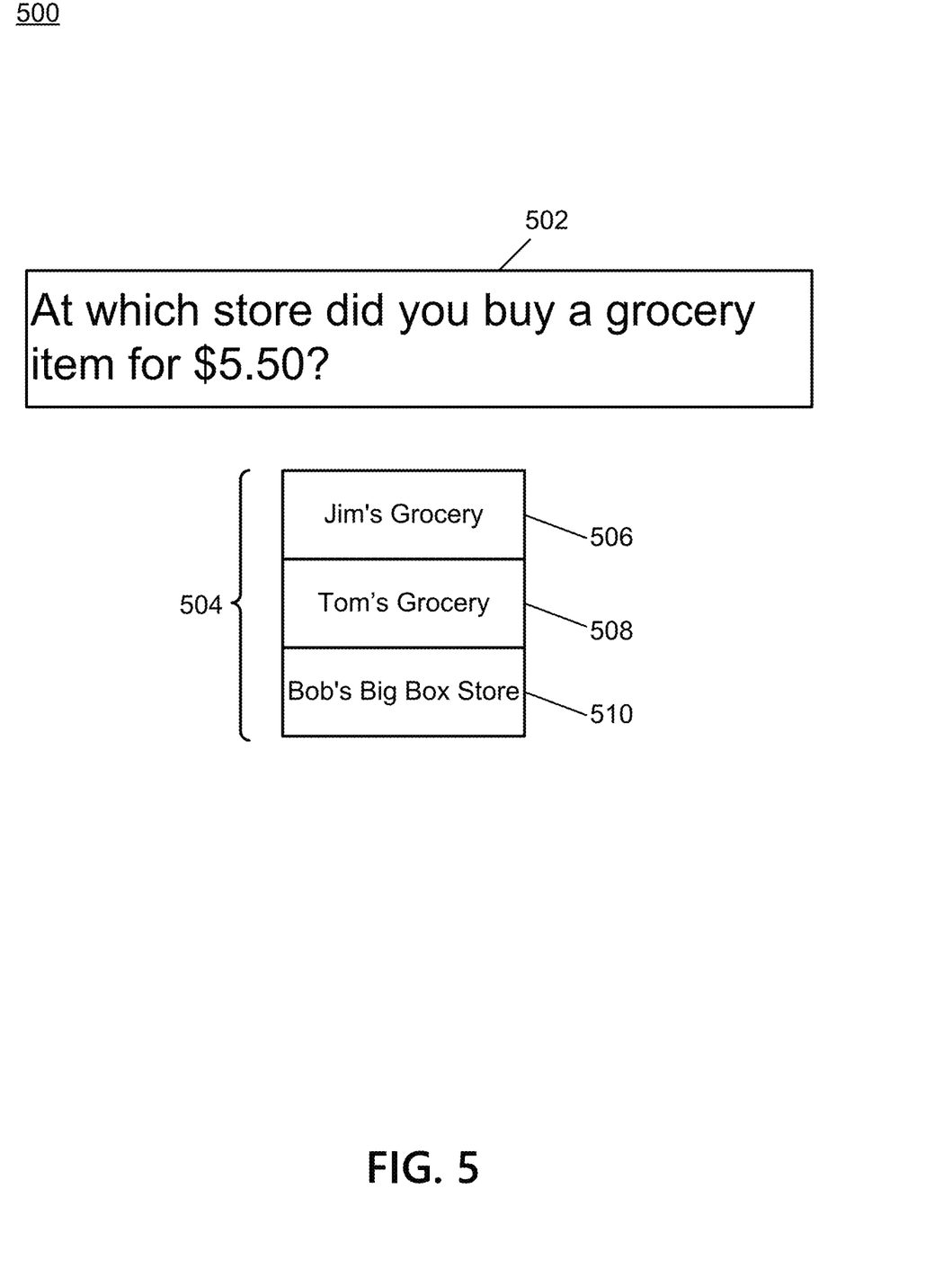
FIG. 5 illustrates an example authentication question presented to a user.

FIG. 5 illustrates an example of an authentication question 500 that may be presented to a user (e.g., the user 302). The authentication question 500 may be presented in any manner to the user. The authentication question 300 may be presented to the user via a display screen (e.g., a display screen of the user computing device 304). The authentication question 300 may be presented to the user audibly (e.g., via a landline phone or via a speaker of the user computing device 304).

The authentication question 500 may include a prompt 502. The authentication question 500 may further include a set of possible answers 504, that includes a first answer choice 506, a second answer choice 508, and a third answer choice 510. As an example, the owner of a financial account may have conducted a transaction at Bob's Big Box Store (represented by the third answer choice 510) on the prior day (yesterday). The transaction may have included the purchase of multiple items, with one of the items being bread for $5.50.

As shown in FIG. 5, the prompt 502 provides the charged price for the purchased bread but does not specifically identify the item purchased. Instead, the prompt 502 includes a category description (e.g., "grocery item") for the item purchased.

A malicious actor may attempt to answer the authentication question 500 but may have a relatively low likelihood of correctly answering the authentication question 500. First, the malicious actor, even if the malicious actor has access to a financial account statement, may be unable to discern purchase prices for each individual item. Instead, the malicious actor may only have access to total transaction prices for particular merchants. Accordingly, based on a financial account statement, the malicious actor may at best only discern that a transaction for $122.37 was conducted at Bob's Big Box Store. Further, the malicious actor may be unaware of what categories of items were purchased. The malicious actor, presented with the authentication question 500, may incorrectly assume from the financial account statement that a grocery item was purchased at a grocery store and so may select the answer choice 506 or the second answer choice 508. In doing so, the malicious actor would answer the authentication question 500 incorrectly, and a malicious attempt at authentication would be denied.

The actual owner of the account, however, may be able to answer the authentication question 500 relatively easy. As an example, the authentication question 500 may be generated based on a determination that the transaction conducted by the user was memorable. The transaction may be considered memorable because the user rarely buys grocery items at Bob's Big Box Store. Accordingly, the user may be more likely to remember a recent transaction at Bob's Big Box Store that involved a grocery item. Accordingly, the authentication question 500 may be readily answered correctly by the user but may be unlikely answered correctly by the malicious actor. As such, the financial account of the user is protected from potentially fraudulent activity by the malicious actor using a transaction-based authentication question 500 that the user may answer without overly burdening the user.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method of authenticating a user of a financial account maintained at a financial institution using knowledge-based authentication questions, the method comprising:
    receiving, by a first computing device of the financial institution and from a user computing device associated with a user, a request for authorization to perform a transaction relating to the financial account, wherein the first computing device is in electronic communication via a network with the user computing device and, and via an application program interface (API), with a third party email server which stores or processes emails of the user, and wherein the emails contain transaction data indicating one or more items purchased by the user, a cost of each item, a merchant from which each item was purchased, and a date/time of each purchase;
    receiving, by the first computing device and from the user computing device, authorization to access the transaction data in the emails of the user;
    storing, by the first computing device, the transaction data in a database associated with the user;
    accessing, by the first computing device and from the database, the stored transaction data of the user;
    processing, by the first computing device, the transaction data to identify financial transaction data relating to the financial account, wherein the financial transaction data comprises indications of a first plurality of different financial transactions;
    selecting, by the first computing device and from among the first plurality of different financial transaction, training data comprising a second plurality of different transactions, wherein the training data indicates, with a tag, for each item of each of each transaction of the second plurality of different transactions, a likelihood that one or more users associated with the transaction would remember purchasing the item, wherein the tag relates to one or more of: a price of each item, or a spending pattern of the user;
    training, by the first computing device and using the training data, a machine learning model comprising a plurality of nodes of an artificial neural network to identify, among the first plurality of different financial transactions, one or more transactions for purchase of an item at a lower or discounted price or transactions that deviate from a typical spending pattern of a user, wherein training the machine learning model comprises determining weights associated with the nodes of the artificial neural network based on the training data, wherein the trained machine learning model is configured to output an indication of a memorability of the one or more transactions;
    providing, by the first computing device and to the trained machine learning model, the transaction data relating to the financial account of the user;
    receiving, from the trained machine learning model, an identification of a first financial transaction of the first plurality of different financial transactions, wherein the first financial transaction is within predetermined time period, and wherein the indication of the memorability of the first financial transaction is high;
    identifying, by the first computing device, a merchant associated with the first financial transaction;
    processing, by the first computing device, data associated with the first financial transaction to extract item-level purchase data associated with the first financial transaction, wherein the item-level purchase data comprises:
        an indication of an item purchased from the merchant within a predetermined period of time; and
        a corresponding price of the item;
    generating, by the first computing device and based on the merchant and the item-level purchase data, an authorization question for determining whether to perform the transaction;
    generating, by the first computing device and based on the financial transaction data, the authorization question, and the item-level purchase data, a correct answer to the authorization question;
    causing, by the first computing device, display of the authorization question on the user computing device, wherein the displayed authorization question relates at least to a name of the merchant, an item associated with the first financial transaction, and a price of the item;
    receiving, by the first computing device and from the user computing device, a response to the authorization question;
    determining, by the first computing device and based on determining whether the response to the authorization question was correct by comparing the response to the authorization question to the correct answer to the authorization question, to grant the request for authorization to perform the transaction relating to the financial account, wherein a correct answer authenticates the user; and
    re-training, using second training data indicating whether the response to the authorization was correct, the trained machine learning model.

2. The method of claim 1, wherein generating the authorization question further comprises generating the authorization question to include a request for the user to indicate a first item associated with the first financial transaction.

3. The method of claim 1, wherein generating the authorization question further comprises generating the authorization question to include a request for the user to indicate the corresponding price of a first item associated with the first financial transaction.

4. The method of claim 1, wherein generating the authorization question further comprises generating the authorization question to include a request for the user to indicate the merchant associated with the first financial transaction.

5. The method of claim 1, further comprising processing, by the first computing device and based on one or more optical character recognition algorithms, a sales receipt associated with the first financial transaction to extract the item-level purchase data associated with the first financial transaction.

6. The method of claim 5, further comprising receiving, by the first computing device and from the user computing device, an image of the sales receipt.

7. The method of claim 1, further comprising determining a first email associated with the first financial transaction.

8. The method of the claim 7, wherein the first email is generated by the merchant.

9. The method of claim 7, wherein the first email is generated by a financial account provider.

10. The method of claim 1, wherein the transaction comprises accessing funds of the financial account.

11. The method of claim 1, wherein the transaction comprises accessing secure information relating to the financial account.

12. An apparatus, of a financial institution, configured to authenticate a user of a financial account maintained at the financial institution using knowledge-based authentication questions, the apparatus comprising:
one or more processors; and
memory storing instructions that, when executed by the one or more processors, cause the apparatus to:
receive, from a user computing device associated with a user, a request for authorization to perform a transaction relating to the financial account, wherein the apparatus is in electronic communications via a network with the user computing device and, and via an application program interface (API), with a third party email server which stores or processes emails of the user, and wherein the emails contain transaction data indicating one or more items purchased by the user, a cost of each item, a merchant from which each item was purchased, and a date/time of each purchase;
receive and from the user computing device, authorization to access the transaction data in the emails of the user;
store the transaction data in a database associated with the user;
access, from the database, the stored transaction data of the user;
process the transaction data to identify financial transaction data relating to the financial account, wherein the financial transaction data comprises indications of a first plurality of different financial transactions;
select, from among the first plurality of different financial transactions, training data comprising a second plurality of different transactions, wherein the training data indicates, with a tag, for each item of each of each transaction of the second plurality of different transactions, a likelihood that one or more users associated with the transaction would remember purchasing the item, wherein the tag relates to one or more of: a price of each item, or a spending pattern of the user;
train, using the training data, a machine learning model comprising a plurality of nodes of an artificial neural network to identify, among the first plurality of different financial transactions, one or more transactions for purchase of an item at a lower or discounted price or transactions that deviate from a typical spending pattern of a user, wherein training the machine learning model comprises determining weights associated with the nodes of the artificial neural network based on the training data, wherein the trained machine learning model is configured to output an indication of a memorability of the one or more transactions;
provide, to the trained machine learning model, the transaction data relating to the financial account of the user;
receiving, from the trained machine learning model, an identification of a first financial transaction of the first plurality of different financial transactions, wherein the first financial transaction is within a predetermined time period, and wherein the indication of the memorability of the first financial transaction is high;
identify a merchant associated with the first financial transaction;
process data associated with the first financial transaction to extract item-level purchase data associated with the first financial transaction, wherein the item-level purchase data comprises:
an indication of an item purchased from the merchant within a predetermined period of time; and
a corresponding price of the item;
generate, based on the merchant and the item-level purchase data, an authorization question for determining whether to perform the transaction;
generate, based on the financial transaction data, the authorization question, and the item-level purchase data, a correct answer to the authorization question;
cause display of the authorization question on the user computing device, wherein the displayed authorization question relates at least to a name of the merchant, and item associated with the first financial transaction, and a price of the item;
receive, from the user computing device, a response to the authorization question;
determine, based on determining whether the response to the authorization question was correct by comparing the response to the authorization question to the correct answer to the authorization question, to grant the request for authorization to perform the transaction relating to the financial account, wherein a correct answer authenticates the user; and
re-train, using second training data indicating whether the response to the authorization was correct, the trained machine learning model.

13. The apparatus of claim 12, the memory storing instructions that, when executed by the one or more processors, cause the apparatus to generate the authorization question to include a request for the user to indicate a first item associated with the first financial transaction.

14. The apparatus of claim 12, the memory storing instructions that, when executed by the one or more processors, cause the apparatus to generate the authorization question to include a request for the user to indicate the corresponding price of a first item associated with the first financial transaction.

15. The apparatus of claim 12, the memory storing instructions that, when executed by the one or more processors, cause the apparatus to generate the authorization question to include a request for the user to indicate the merchant associated with the first financial transaction.

16. The apparatus of claim 12, the memory storing instructions that, when executed by the one or more processors, cause the apparatus to receive the item-level purchase data from an owner of the financial account.

17. One or more non-transitory media storing instructions that, when executed by one or more processors of a first computing device of a financial institution, cause the one or more processors to authenticate a user of a financial account maintained at the financial institution using knowledge-based authentication questions by causing the one or more processors to perform steps comprising:
- receive, from a user computing device associated with a user, a request for authorization to perform transaction relating to the financial account, wherein the first computing device is in electronic communication via a network with the user computing device and, and via an application program interface (API), with a third part email server which stores or processes emails of the user, and wherein the emails contain transaction data indicating one or more items purchased by the user, a cost of each item, a merchant from which each item was purchased, and a date/time of each purchase;
- receive, from the user computing device, authorization to access the transaction data in the emails of the user;
- store the transaction data in a database associated with the user;
- access, from the database, the stored transaction data of the user;
- process the transaction data to identify financial transaction data relating to the financial account, wherein the financial transaction data comprises indications of a first plurality of different financial transactions;
- select, by the first computing device and from among the first plurality of different financial transactions, training data comprising a second plurality of different transactions, wherein the training data indicates, with a tag, for each item of each of each transaction of the second plurality of different transactions, a likelihood that one or more users associated with the transaction would remember purchasing the item, wherein the tag relates to one or more of: a price of each item, or a spending pattern of the user;
- train, using the training data, a machine learning model comprising a plurality of nodes of an artificial neural network to identify, among the first plurality of different financial transactions, one or more transactions for purchase of an item at a lower or discounted price or transactions that deviate from a typical spending pattern of a user, wherein training the machine learning model comprises determining weights associated with the nodes of the artificial neural network based on the training data, wherein the trained machine learning model is configured to output an indication of a memorability of the one or more transactions;
- provide, to the trained machine learning model, the transaction data relating to the financial account of the user;
- receive, from the machine learning model, an identification of a first financial transaction of the first plurality of different financial transactions, wherein the first financial transaction is within a predetermined time period, and wherein the indication of the memorability of the first financial transaction is high;
- identify a merchant associated with the first financial transaction;
- process data associated with the first financial transaction to extract item-level purchase data associated with the first financial transaction, wherein the item-level purchase data comprises:
  - an indication of an item purchased from the merchant within a predetermined period of time; and
  - a corresponding price of the item;
- generate, based on the merchant and the item-level purchase data, an authorization question for determining whether to perform the transaction;
- generate, based on the financial transaction data, the authorization question, and the item-level purchase data, a correct answer to the authorization question;
- cause display of the authorization question on the user computing device, wherein the displayed authorization question relates at least to a name of the merchant, an item associated with the first financial transaction, and a price of the item;
- receive, from the user computing device, a response to the authorization question;
- determine, based on determining whether the response to the authorization question was correct by comparing the response to the authorization question to the correct answer to the authorization question, to grant the request for authorization to perform the transaction relating to the financial account, wherein a correct answer authenticates the user; and
- re-train, using second training data indicating whether the response to the authorization was correct, the trained machine learning model.

18. The one or more non-transitory media of claim 17, wherein the instructions, when executed by the one or more processors, cause the one or more processors to generate the authorization question to include a request for the user to indicate a first item associated with the first financial transaction.

19. The one or more non-transitory media of claim 17, wherein the instructions, when executed by the one or more processors, cause the one or more processors to generate the authorization question to include a request for the user to indicate the corresponding price of a first item associated with the first financial transaction.

20. The one or more non-transitory media of claim 17, wherein the instructions, when executed by the one or more processors, cause the one or more processors to generate the authorization question to include a request for the user to indicate the merchant associated with the first financial transaction.

* * * * *